(12) United States Patent
Kalsi

(10) Patent No.: US 7,017,443 B2
(45) Date of Patent: Mar. 28, 2006

(54) KICKDOWN FOR PEDAL ASSEMBLY

(75) Inventor: Avtar S. Kalsi, Windsor (CA)

(73) Assignee: DriveSol Worldwide, Inc., Troy, MI (US)

( * ) Notice: Subject to any disclaimer, the term of this patent is extended or adjusted under 35 U.S.C. 154(b) by 278 days.

(21) Appl. No.: 10/354,580

(22) Filed: Jan. 30, 2003

(65) Prior Publication Data

US 2004/0149072 A1   Aug. 5, 2004

(51) Int. Cl.
*G05G 1/14* (2006.01)
(52) U.S. Cl. .......................................... 74/514; 74/512
(58) Field of Classification Search ................. 74/512, 74/513, 560, 514, 527, 529, 531, 532, 534, 74/502.4, 802.6
See application file for complete search history.

(56) References Cited

U.S. PATENT DOCUMENTS

| | | | |
|---|---|---|---|
| 3,643,525 A | | 2/1972 | Gibas |
| 4,070,914 A | * | 1/1978 | Reinhardt et al. ........ 74/473.11 |
| 4,429,589 A | | 2/1984 | Stocker |
| 4,646,582 A | * | 3/1987 | Kijima ................... 74/473.33 |
| 4,651,595 A | | 3/1987 | Miyawaki |
| 5,477,742 A | * | 12/1995 | Burger .................... 74/473.26 |
| 5,697,253 A | | 12/1997 | Papenhagen et al. |
| 5,769,754 A | | 6/1998 | Kil |
| 5,806,376 A | | 9/1998 | Papenhagen et al. |
| 5,855,146 A | | 1/1999 | Papenhagen et al. |
| 5,934,152 A | | 8/1999 | Aschoff et al. |
| 6,070,490 A | | 6/2000 | Aschoff et al. |
| 6,209,418 B1 | | 4/2001 | Kalsi et al. |
| 6,298,748 B1 | * | 10/2001 | Rixon et al. ................ 74/512 |
| 6,305,239 B1 | * | 10/2001 | Johansson et al. .......... 74/512 |
| 6,305,240 B1 | | 10/2001 | Hannewald et al. |
| 6,418,813 B1 | * | 7/2002 | Lewis ........................ 74/527 |
| 6,626,061 B1 | * | 9/2003 | Sakamoto et al. .......... 74/512 |
| 2004/0149071 A1 | * | 8/2004 | Crack ......................... 74/514 |

* cited by examiner

Primary Examiner—Vicky A. Johnson
(74) Attorney, Agent, or Firm—Howard & Howard

(57) ABSTRACT

A pedal assembly (12) for electronically controlling an engine throttle (38). The pedal assembly (12) includes a pedal housing (14), a pedal arm (18) pivotally engaging the pedal housing (14), and an electrical generator (30) supported by the pedal housing (14). The pedal arm (18) is operable between an idle position (24) and a plurality of operable positions. When the pedal arm (18) is pivoted to a predetermined operable position (50), a kickdown member (46) provides a kickdown feel to a user. Simultaneously, the electrical generator (30) generates a control signal having a predetermined magnitude causing the automatic transmission (42) to downshift to a next lower gear. The kickdown member (46) is adjustable to synchronize the kickdown feel provided by the kickdown member (46) with the downshift to the next lower gear.

26 Claims, 7 Drawing Sheets

KICKDOWN FOR PEDAL ASSEMBLY

FIELD OF THE INVENTION

The present invention relates generally to a pedal assembly having an electrical generator for electronically controlling an engine throttle in a vehicle and a kickdown mechanism for generating a kickdown feel. Specifically, the kickdown mechanism includes a kickdown member to generate the kickdown feel representing a downshift to a lower gear by an automatic transmission.

BACKGROUND OF THE INVENTION

Prior art pedal assemblies generally comprise a pedal housing attached to a vehicle body and a pedal arm pivotally supported by the pedal housing. A series of links and levers, or cables, mechanically connect the pedal assembly to an engine throttle. Therefore, movement of the pedal arm mechanically controls a position of the engine throttle. In addition, a kickdown device is mechanically connected to the pedal assembly. The kickdown device is used to initiate a kickdown, i.e., a downshift to a next lower gear in an automatic transmission. Typically, such downshifts occur when a user desires fast acceleration. For instance, when the pedal arm is pivoted from an idle position to a predetermined operable position, the kickdown device is mechanically engaged to downshift the automatic transmission. As a result, an added force is required to further pivot the pedal arm. This added force provides a sensation to the user that is commonly referred to as a kickdown feel, i.e., the user can "feel" when the kickdown device is engaged, and hence, when the automatic transmission downshifts to the next lower gear.

Consequently, a large amount of packaging space must be provided within the vehicle to accommodate the mechanical connections to the kickdown device and the engine throttle. However, the space available for the mechanical connections is limited. Hence, recent improvements in the prior art use electrical connections in place of the mechanical connections. Instead of using the mechanical connections to mechanically transmit a position of the pedal arm to the engine throttle or kickdown device, an electrical generator is used to electrically transmit the position of the pedal arm and subsequently control the engine throttle and the kickdown. Replacing the mechanical connections with electrical connections reduces the necessary packaging space for the pedal assembly.

In prior art electronic pedal assemblies, the electrical generator generates a control signal that varies in magnitude with respect to the position of the pedal arm relative to the pedal housing. The control signal is sent to a controller that is responsive to the electrical generator. A processor in the controller uses the control signal to generate other control signals to control the position of the engine throttle and to control the downshift. In general, the downshift occurs when the control signal has a predetermined magnitude and the controller, in response, instructs the automatic transmission to downshift to the next lower gear. In other words, the controller is programmed to control the automatic transmission to downshift to the next lower gear when the control signal has the predetermined magnitude.

Unfortunately, without the mechanical connections, electronic pedal assemblies do not provide the customary feel and performance of a mechanically connected pedal assembly. In other words, the pedal assembly does not provide the kickdown feel to the user when the downshift occurs, i.e., the user cannot "feel" when the downshift occurs. To solve this problem, manufacturers incorporate a kickdown mechanism in the electronic pedal assembly to provide the kickdown feel to the user. The kickdown mechanism is markedly different than the kickdown device described above. The kickdown device is mechanically connected to the pedal assembly via a link or cable and mechanically initiates the downshift in the automatic transmission. Conversely, the kickdown mechanism does not initiate the downshift. Unlike the kickdown device, the kickdown mechanism is a stand-alone mechanism simply used to provide the kickdown feel to the user. Typically, the kickdown mechanism provides the added force associated with the kickdown feel via a kickdown member that engages a portion of the pedal arm.

An example of a kickdown device mechanically connected to the pedal assembly to initiate a downshift in an automatic transmission is shown in U.S. Pat. No. 5,697,253 to Papenhagen et al.

An example of a kickdown mechanism used in an electronic pedal assembly to provide a kickdown feel is shown in U.S. Pat. No. 6,209,418 to Kalsi et al. The kickdown mechanism in the '418 patent utilizes a kickdown member that engages a portion of a pedal arm.

Even with the kickdown member to simulate the kickdown feel, prior art electronic pedal assemblies cannot control a position of the kickdown member to ensure that the pedal arm will engage the kickdown member when the pedal arm is at a predetermined operable position. This can present problems when the predetermined operable position coincides with downshifting of the automatic transmission. Without the ability to control a position of the kickdown member, there is a significant likelihood that the kickdown feel provided by the kickdown member will not occur when the downshift occurs. A typical prior art electronic pedal assembly includes many tolerances between the kickdown member and the pedal arm and between the pedal arm and the electrical generator. Thus, a fixed kickdown member is unlikely to be engaged by the pedal arm when the pedal arm is at the predetermined operable position. Therefore, there exists a need in the art for an electronic pedal assembly capable of adjusting the kickdown member and ensuring that the pedal arm is at the predetermined operable position when the pedal arm engages the kickdown member.

BRIEF SUMMARY OF THE INVENTION

The present invention provides a pedal assembly for use in a vehicle. The pedal assembly comprises a pedal housing. A pedal arm pivotally engages the pedal housing and operates between an idle position and a plurality of operable positions. A kickdown member engages a portion of the pedal arm when the pedal arm is pivoted to a predetermined operable position from the idle position. A force required to further pivot the pedal arm after the pedal arm reaches the predetermined operable position is greater than a force required to pivot the pedal arm from the idle position to the predetermined operable position. An electrical generator is supported by the pedal housing to generate a control signal that varies in magnitude in proportion to the extent of movement of the pedal arm relative to the pedal housing. An adjustment mechanism adjusts the kickdown member relative to the pedal arm to control a position of the kickdown member and ensure that the pedal arm engages the kickdown member when the pedal arm is pivoted to the predetermined operable position.

A method of providing a kickdown feel in the pedal assembly is also provided. The method includes the steps of detecting the control signal of the electrical generator and moving the pedal arm relative to the pedal housing while detecting the control signal. The kickdown member is then adjusted relative to the pedal arm when the control signal has a predetermined magnitude. As a result, the position of the kickdown member is controlled to ensure that the pedal arm engages the kickdown member when the control signal of the electrical generator is at the predetermined magnitude during operation of the pedal assembly. Hence, the kickdown feel generated by the kickdown member is synchronized with the generation of the control signal at the predetermined magnitude.

The present invention provides several advantages over the prior art. Notably, the present invention allows a manufacturer to synchronize a downshift to a next lower gear in an automatic transmission with the kickdown feel generated by the kickdown member. For instance, a controller may receive the control signal from the electrical generator and initiate the downshift when the control signal has the predetermined magnitude. Since the kickdown member is adjusted to ensure that the pedal arm engages the kickdown member when the control signal has the predetermined magnitude, the downshift is synchronized with the kickdown feel produced by the kickdown member.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a pedal assembly for use in a vehicle 10 is generally shown at 12.

The pedal assembly 12 comprises a pedal housing 14. The pedal housing 14 is mounted to a vehicle structure of the vehicle 10, such as a vehicle dash, bracket or frame member 16, by means well known in the art.

Figure 1:
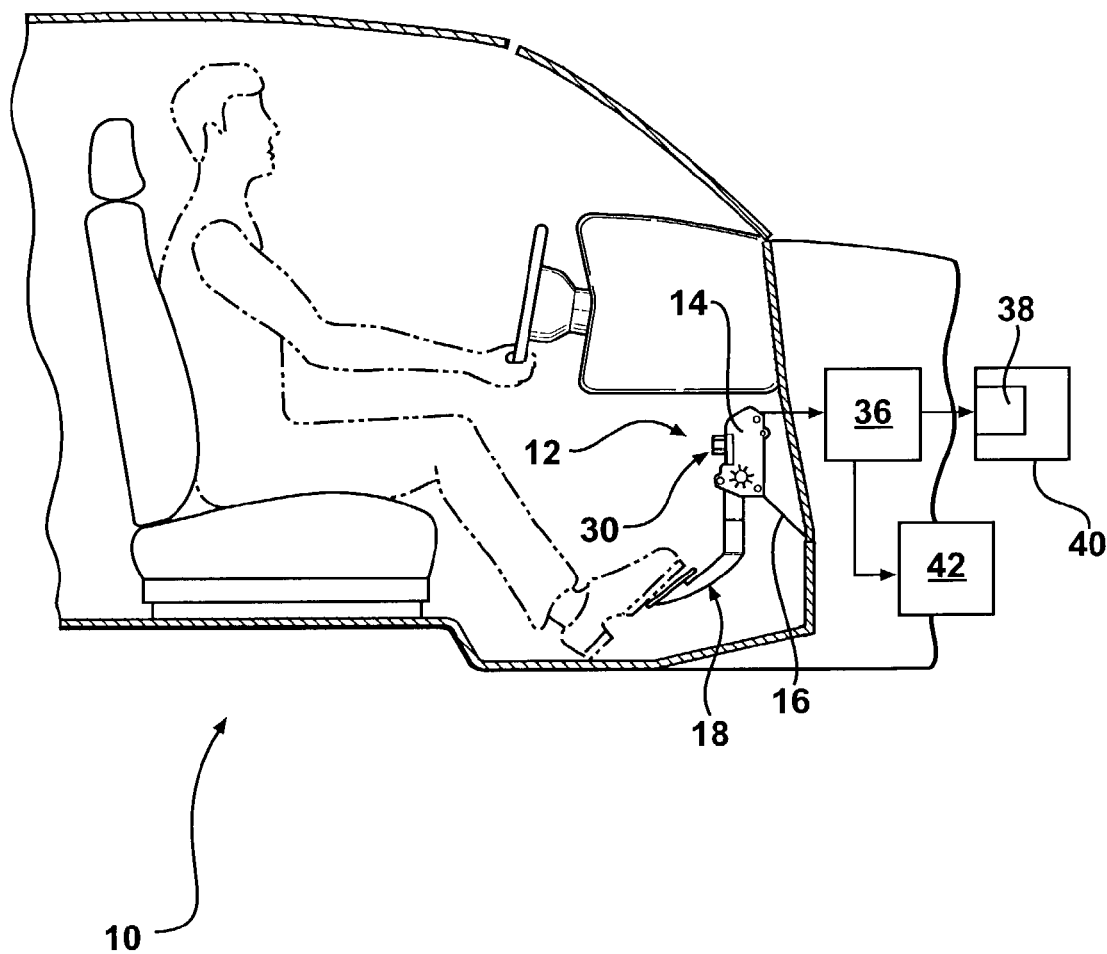
FIG. 1 is a cross-sectional view of a vehicle having a pedal assembly of the present invention further illustrating an electrical connectivity of the pedal assembly with a controller, engine throttle, and automatic transmission.
Figure 2:
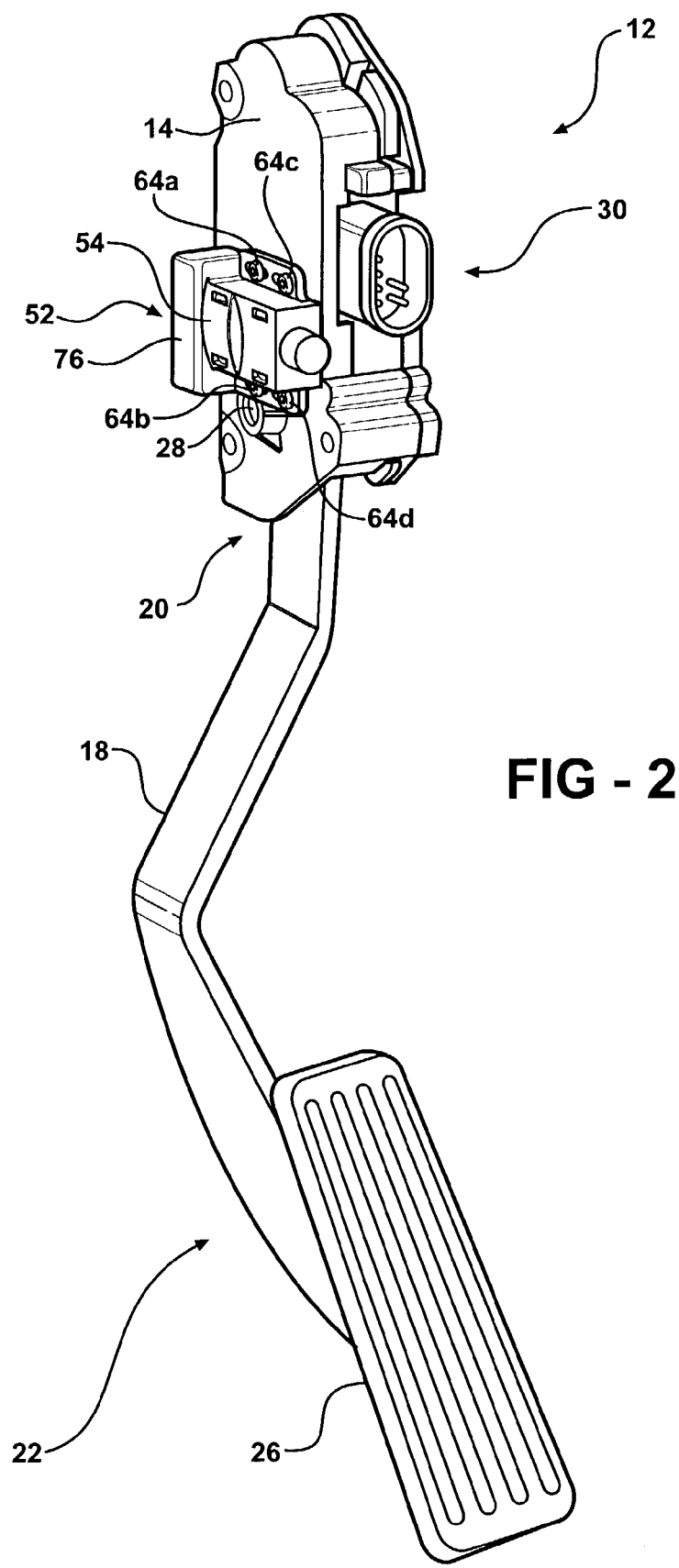
FIG. 2 is a perspective view of the pedal assembly of the present invention.

Referring to FIGS. 1 and 2, a pedal arm 18 having upper 20 and lower 22 ends pivotally engages the pedal housing 14. The pedal arm 18 is movable between an idle position 24 and a plurality of operable positions. A pedal pad 26 is connected to the lower end 22 of the pedal arm 18. The upper end 20 of the pedal arm 18 is pivotally attached to the pedal housing 14 by a pivot shaft or pin 28. The pedal arm 18 is preferably formed from steel or polymeric material and the pedal housing 14 is preferably made from a polymeric material such as nylon. It should be appreciated, however, that the material used in the pedal assembly 12 is not intended to limit the present invention.

Figure 6C:
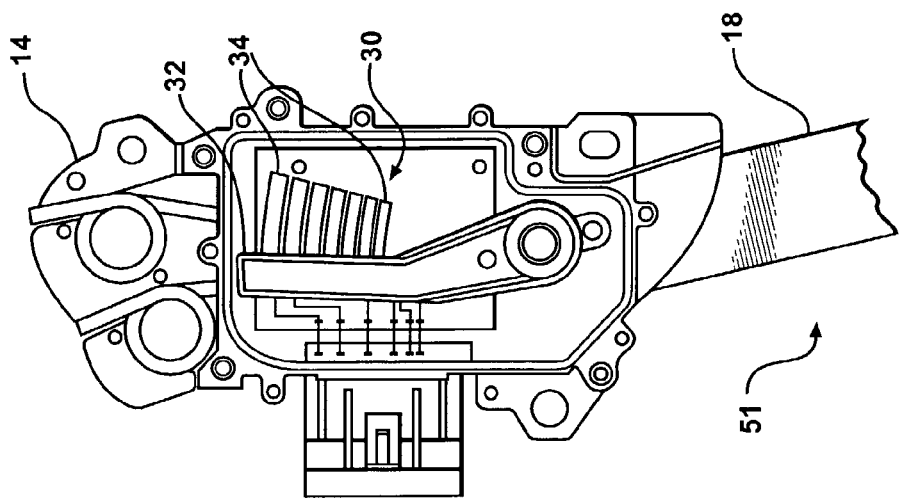
FIG. 6C is a cross-sectional view of the pedal assembly illustrating the electrical generator of the pedal assembly when the pedal arm is at the maximum travel position.
Figure 6B:
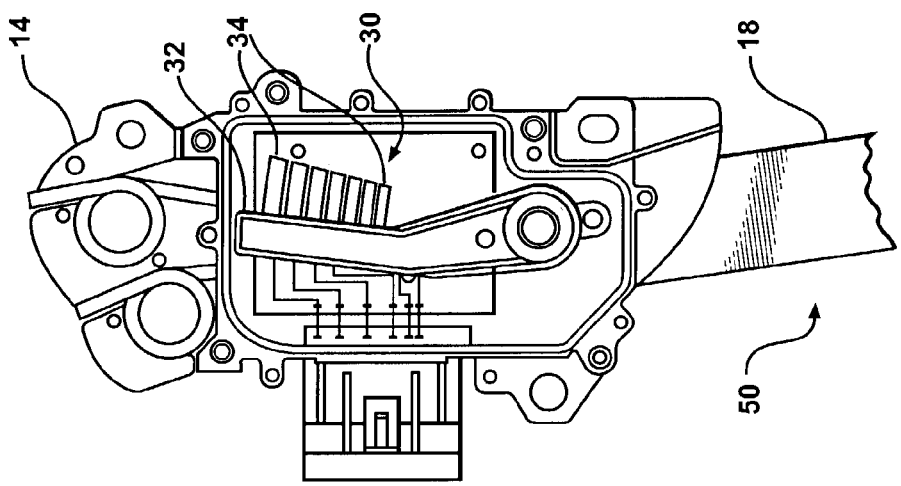
FIG. 6B is a cross-sectional view of the pedal assembly illustrating the electrical generator of the pedal assembly when the pedal arm is at the predetermined operable position.
Figure 6A:
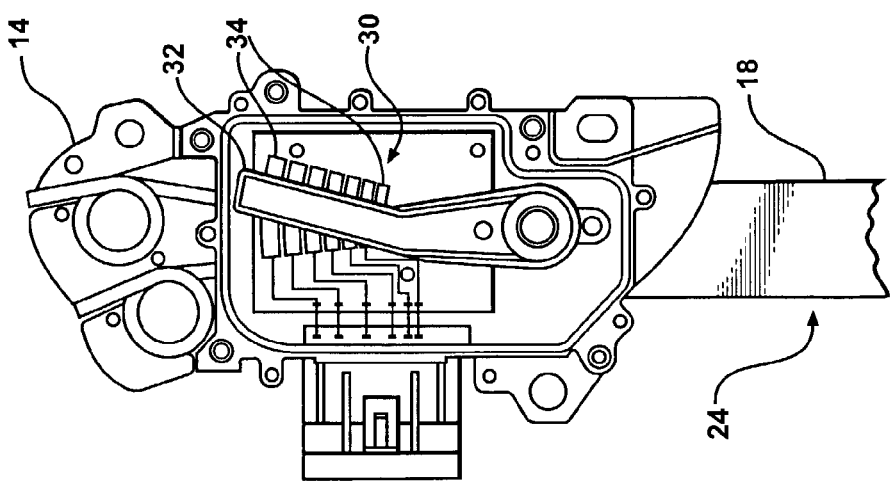
FIG. 6A is a cross-sectional view of the pedal assembly illustrating an electrical generator of the pedal assembly when the pedal arm is at the idle position.

The pedal housing 14 supports an electrical generator 30. The electrical generator 30 is best shown in FIGS. 6A–6C. The electrical generator 30 generates a control signal that varies in magnitude in proportion to the extent of movement of the pedal arm 18 relative to the pedal housing 14. The electrical generator 30 is typically a potentiometer. However, other generators or sensors known in the art can be used such as non-contact Hall effect sensors, and the like. In the preferred embodiment, the electrical generator 30 includes a sensing arm 32 that wipes across a plurality of sensing bands 34. The magnitude of the control signal varies as the sensing arm 32 moves across the sensing bands 34, i.e., the sensing bands 34 are resistors and the control signal varies as the resistance varies.

Referring back to FIG. 1, the control signal is sent to a controller (not shown) having a computer processor 36 that uses the control signal to control an engine throttle 38. When the controller receives the control signal from the electrical generator 30, the processor 36 generates a second control signal to control the position of the engine throttle 38. These control signals are communicated along electrical connections, as is well known in the art. The engine throttle 38 regulates the amount of fuel that enters a vehicle engine 40 based on the varying control signal sent from the electrical generator 30. The vehicle engine 40 is mechanically connected to an automatic transmission 42 that is shiftable between high and low gear positions. The vehicle engine 40 supplies varying power to the automatic transmission 42, which controls the magnitude of output speed and torque. Hence, the output speed and torque are dependent on the control signal that represents a position of the pedal arm 18.

Occasionally, a user will desire fast acceleration, which requires the automatic transmission 42 to downshift to a next lower gear. Downshifting of the automatic transmission 42 can be accomplished by any means known in the art, including by electrical or mechanical control. In the preferred embodiment, the downshift occurs when the control signal generated by the electrical generator 30 has a predetermined magnitude. During operation, the controller receives the control signal having the predetermined magnitude from the electrical generator 30, and in response, the processor 36 sends a third control signal to control the automatic transmission 42 and initiate the downshift.

A kickdown mechanism 44 imparts a kickdown feel to the user. Referring to FIGS. 3–5C, the kickdown mechanism 44 includes a kickdown member 46 that engages a portion 48 of the pedal arm 18 when the pedal arm 18 is pivoted to a predetermined operable position 50 from the idle position 24. In the preferred embodiment, the predetermined operable position 50 is the position of the pedal arm 18 at which the control signal has the predetermined magnitude. Hence, the downshift is synchronized with the kickdown feel. It should be appreciated, however, that the present invention is not limited to the predetermined operable position 50 being the position of the pedal arm 18 at which the downshift occurs. For instance, the predetermined operable position may be a position of the pedal arm 18 before of after the downshift occurs.

During operation of the pedal assembly 12, a force required to further pivot the pedal arm 18 after the pedal arm 18 reaches the predetermined operable position 50 and engages the kickdown member 46 is greater than a force required to pivot the pedal arm 18 from the idle position 24 to the predetermined operable position 50. Hence, the kickdown member 46 provides the kickdown feel. Any suitable kickdown member capable of providing the kickdown feel may be used. The kickdown feel is imparted to the user's foot at the pedal pad 26. Preferably, the kickdown feel occurs when the pedal arm 18 achieves nearly full travel, i.e., close to a maximum travel position 51. However, other activation points can be utilized.

Figure 5A:
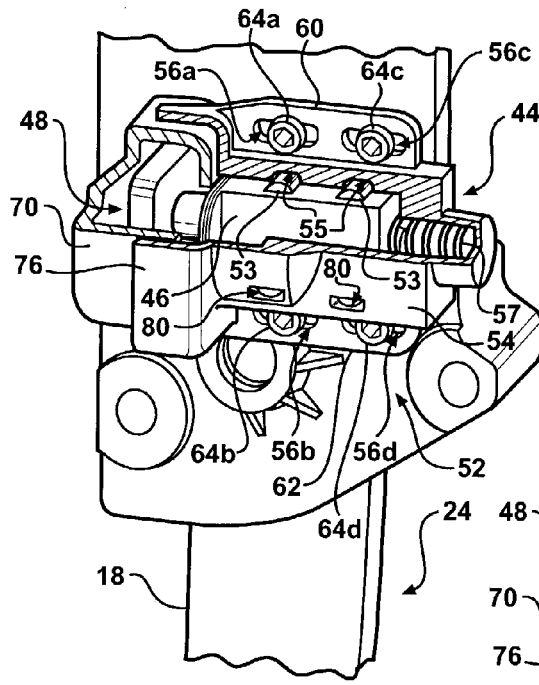
FIG. 5A is a perspective cut-away view of the pedal assembly of the present invention illustrating an idle position of a pedal arm.
Figure 5B:
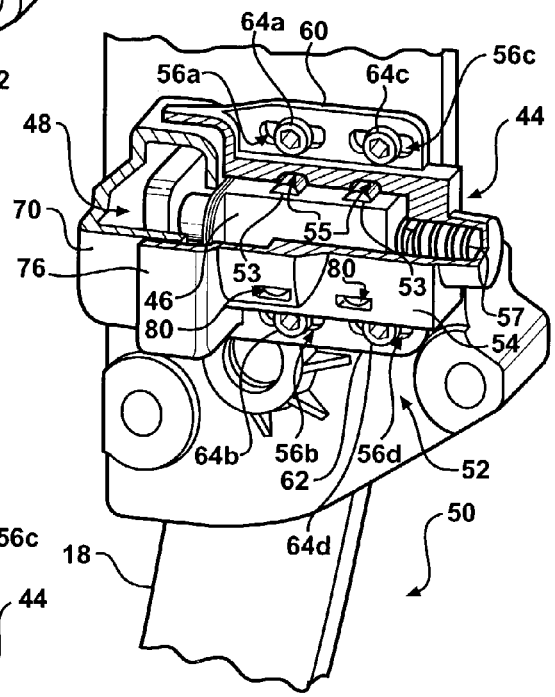
FIG. 5B is a perspective cut-away view of the pedal assembly of the present invention illustrating a predetermined operable position of the pedal arm.
Figure 5C:
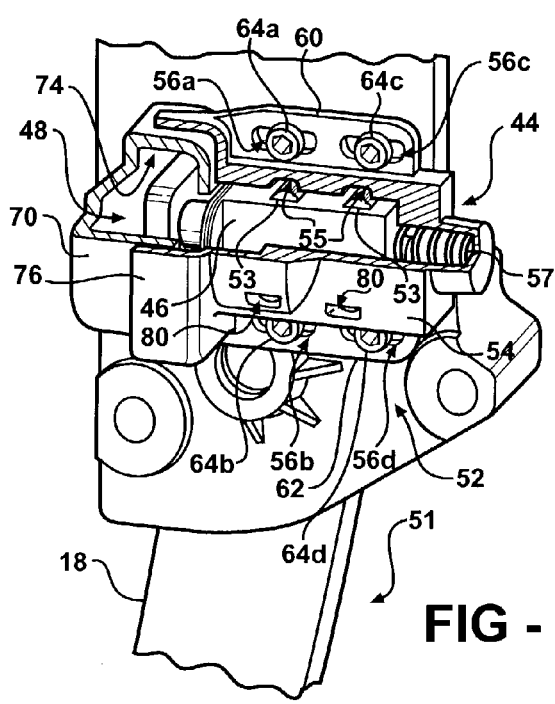
FIG. 5C is a perspective cut-away view of the pedal assembly of the present invention illustrating a maximum travel position of the pedal arm.

Illustration of the pedal arm 18 moving between the idle position 24 and the predetermined operable position 50 and between the predetermined operable position 50 and the maximum travel position 51 is shown in FIGS. 5A–5C and 6A–6C. FIG. 5A shows the pedal arm 18 in the idle position 24. Here, the portion 48 of the pedal arm 18 has not yet contacted or engaged the kickdown member 46. FIG. 5B shows the pedal arm 18 in the predetermined operable position 50. In this position, the portion 48 of the pedal arm 18 has just engaged the kickdown member 46, thus initiating the kickdown feel. At this position, the electrical generator 30 also transmits the control signal at the predetermined magnitude. FIG. 5C shows the pedal arm 18 in the maximum travel position 51. Here, the downshift has already occurred and the user has already experienced the kickdown feel via movement of the kickdown member 46, as will be described further below. FIGS. 6A–6C further illustrate positions of the sensing arm 32 that correspond to the positions 24,50,51 of the pedal arm 18.

An adjustment mechanism 52 adjusts the kickdown member 46 relative to the pedal arm 18 to control a position of the kickdown member 46 and ensure that the portion 48 of the pedal arm 18 engages the kickdown member 46 when the pedal arm is at the predetermined operable position 50. As previously mentioned, the predetermined operable position 50 corresponds to the downshift of the automatic transmission. Preferably, adjustment of the kickdown member 46 occurs prior to operation of the pedal assembly 12, e.g., during manufacture. However, in some instances, adjustment may be performed after operation commences, such as after an accident or during routine maintenance.

In the preferred embodiment, the adjustment mechanism 52 encloses and engages the kickdown member 46. Specifically, the adjustment mechanism 52 includes a kickdown housing 54 adjustably connected to the pedal housing 14 that encloses and engages the kickdown member 46.

Figure 3:
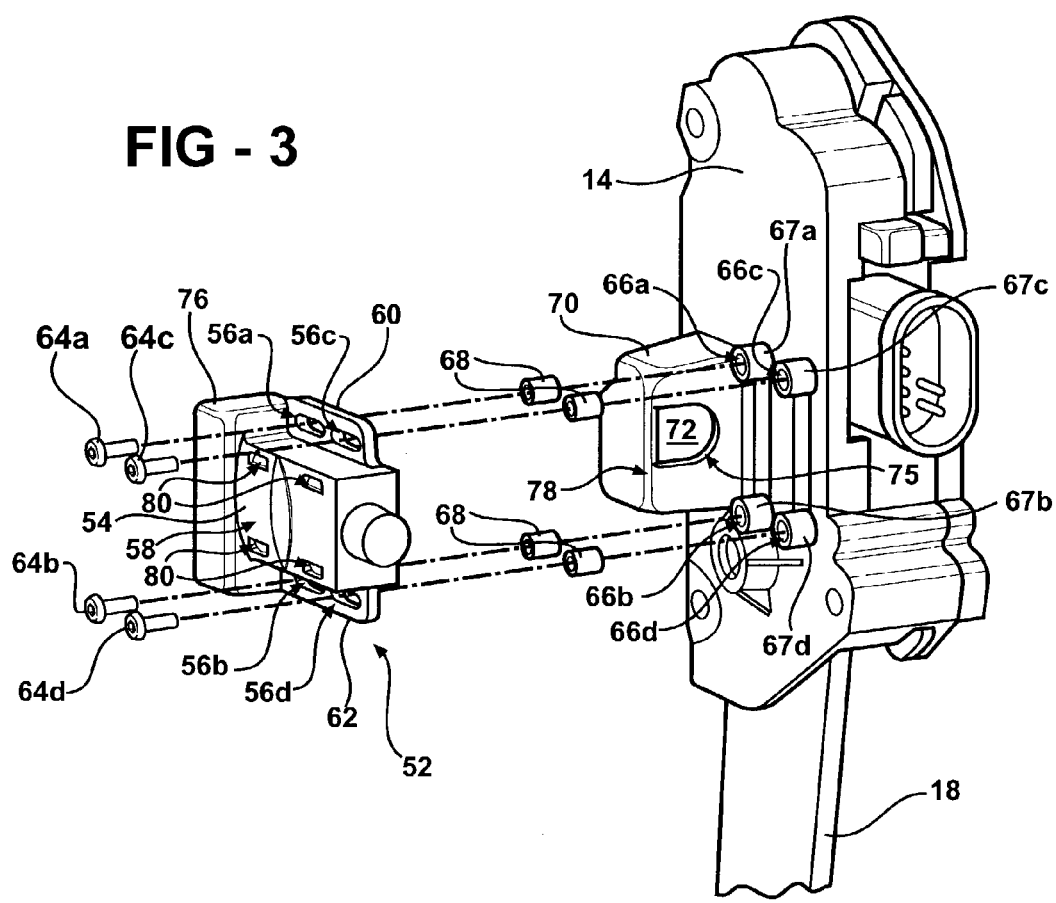
FIG. 3 is an exploded view of the pedal assembly of the present invention.
Figure 4:
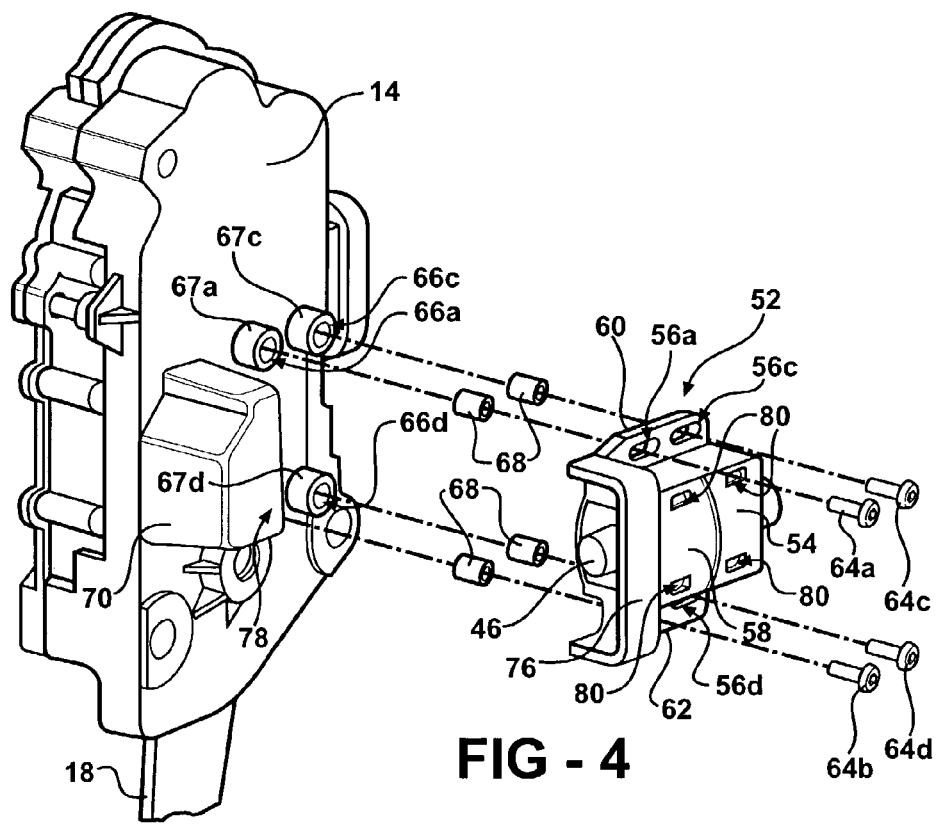
FIG. 4 is an exploded view of the pedal assembly of the present invention.

Referring to FIGS. 3 and 4, the kickdown housing 54 defines a plurality of slots 56 therein to provide adjustment of the kickdown housing 54 relative to the pedal housing 14.

The kickdown housing 54 includes a main portion 58 and upper 60 and lower 62 flanges connected to the main portion 58 and extending upwardly and downwardly from the main portion 58. In the preferred embodiment, the plurality of slots 56 are defined in the upper 60 and lower 62 flanges. In particular, first 56a and third 56c slots are defined in the upper flange 60 and second 56b and fourth 56d slots are defined in the lower flange 62. The slots 56 extend parallel to one another and generally transverse to the pedal arm 18.

A plurality of adjusting fasteners 64 extend through the slots 56 into projections 67 extending from the pedal housing 14 to adjustably connect the kickdown housing 54 to the pedal housing 14. Specifically, the plurality of adjusting fasteners 64 extend through the slots 56 into bores 66 defined within the projections 67. The kickdown housing 54 is adjusted by sliding the kickdown housing 54 relative to the pedal housing 14 along the adjusting fasteners 64. The kickdown member 46 moves with the kickdown housing 54 during adjustment. Hence, the kickdown member 46 is adjusted by sliding the kickdown housing 54 relative to the pedal housing 14.

It should be appreciated that the adjustment mechanism 52 may include any number of slots 56 and adjusting fasteners 64 to adjustably connect the kickdown housing 54 to the pedal housing 14. In the preferred embodiment, first 64a, second 64b, third 64c, and fourth 64d adjusting fasteners extend through the first 56a, second 56b, third 56c, and fourth 56d slots, respectively. Furthermore, the first 64a, second 64b, third 64c, and fourth 64d adjusting fasteners extend through the first 56a, second 56b, third 56c, and fourth 56d slots into first 66a, second 66b, third 66c, and fourth 66d bores defined within first 67a, second 67b, third 67c, and fourth 67d projections. The bores 66 are formed in the pedal housing 14 to retain the adjusting fasteners 64.

The present invention should not be interpreted as being limited to the specific configuration of the adjustment mechanism 52. For instance, tracks instead of the slots 56 could be used to adjustably connect the kickdown housing 54 to the pedal housing 14. Furthermore, the adjusting fasteners 64 may be screws, rivets, bolts, and the like to adjustably connect the kickdown housing 54 to the pedal housing 14.

A plurality of snug-fit bushings 68 are positioned in the bores 66 in the pedal housing 14. The adjusting fasteners 64 extend through the slots 56 and the snug-fit bushings 68 into the bores 66 to create a snug-fit between the adjusting fasteners 64 and the pedal housing 14.

A pedal arm jacket 70 encloses the portion 48 of the pedal arm 18 that engages the kickdown member 46. Referring specifically to FIG. 3, the portion 48 of the pedal arm 18 is further defined as a plate 72 connected to the pedal arm 18 and the plate 72 extends perpendicularly from the pedal arm 18 into the pedal arm jacket 70 through an opening 74 (See FIG. 5C) defined between the pedal housing 14 and the pedal arm jacket 70. In addition, the kickdown member 46 engages the plate 72 through a second opening 75 defined by the pedal arm jacket 70.

The pedal arm jacket 70, kickdown housing 54, and kickdown member 46 are preferably made from a polymeric material. However, other materials such as steel, aluminum, and the like may be used.

The kickdown housing 54 includes a lip 76 connected to the main portion 58 that covers a portion 78 of the pedal arm jacket 70. This is best shown in FIGS. 5A–5C. The lip 76 is slidable across the pedal arm jacket 70 when the kickdown housing 54 is adjusted relative to the pedal housing 14.

Referring to FIGS. 5A–5C, the kickdown member 46 is movable relative to the kickdown housing 54. The kickdown member 46 moves between a rest position and a plurality of active positions. The force required to move the kickdown member 46 relative to the kickdown housing 54 represents the kickdown feel. In particular, detent members 53 that are springably movable into and out of detent pockets 55 in the kickdown housing 54 provide resistance to movement that generate the kickdown feel. FIGS. 5A and 5B show the detent members 53 in the detent pockets 55 as the pedal arm 18 moves between the idle position 24 and the predetermined operable position 50, i.e., the kickdown member 46 is in the rest position. FIG. 5C shows the detent members 53 being forced out from the detent pockets 55 when the pedal arm 18 moves from the predetermined operable position 50 toward the maximum travel position 51, i.e., the kickdown member 46 has moved from the rest position to one of the active positions. The user must apply an added force to urge the detent members 53 from the detent pockets 55.

The detent members 53 may be made from a springable material and simply deform to generate the kickdown feel. Preferably, the detent members 53 are rollers that springably recess into the kickdown member 46. A spring (not shown) reacts between upper and lower pairs of the detent members 53 to urge the detent members 53 into the detent pockets 55. The kickdown member 46 provides the kickdown feel by being resilient to movement as the pedal arm 18 moves from the predetermined operable position 50 toward the maximum travel position 51. The interaction between the detent members 53 and detent pockets 55 provide this resiliency.

A spring 57 biases the kickdown member 46 toward the portion 48 of the pedal arm 18, effectively biasing the detent members 53 into the detent pockets 55. Thus, the user must apply enough force to urge the detent members 53 from the detent pockets 55 and to overcome the biasing effect of the spring 57 when moving the pedal arm 18 from the predetermined operable position 50 toward the maximum travel position 51. When the user releases the pedal arm 18 when the pedal arm 18 is between the predetermined operable position 50 and the maximum travel position 51, e.g., to decelerate, the spring 57 biases the kickdown member 46 toward the portion 48 of the pedal arm 18 and the detent members 53 return to the detent pockets 55.

Figure 7A:
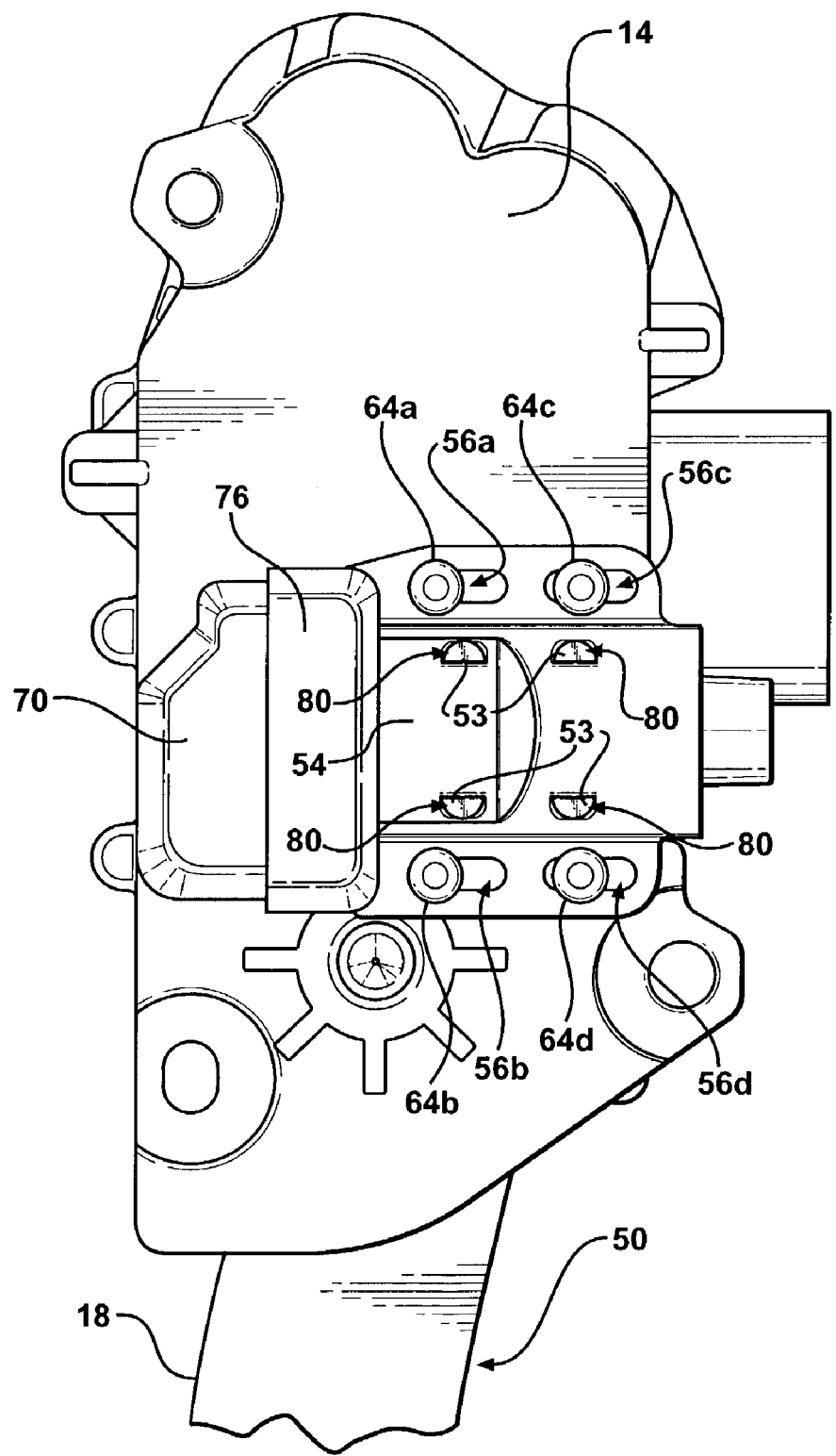
FIG. 7A is an elevational side view of the pedal assembly of the present invention when the pedal arm is at the predetermined operable position.
Figure 7B:
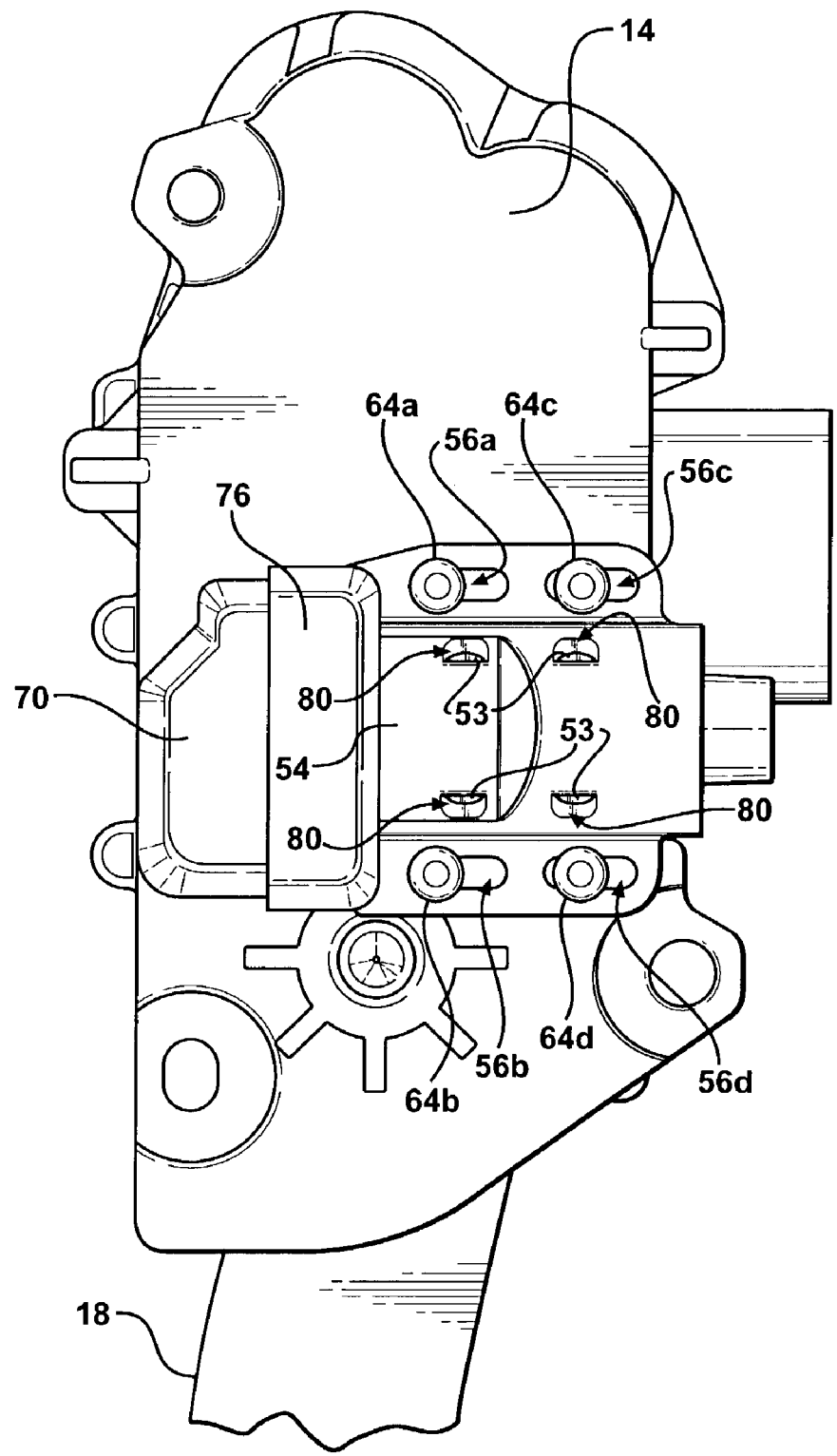
FIG. 7B is an elevational side view of the pedal assembly of the present invention when the pedal arm is at the maximum travel position.

Referring to FIGS. 7A and 7B, the kickdown housing 54 defines a plurality of indicator windows 80 therein to determine the extent of movement between the kickdown member 46 and the kickdown housing 54. In other words, the indicator windows 80 provide an indication of whether or not the kickdown member 46 has moved relative to the kickdown housing 54. The indicator windows 80 coextend with the detent pockets 55. Hence, the detent members 53 should be fully viewable within the indicator windows 80 when the kickdown member 46 is in the rest position. As previously discussed, the kickdown member 46 does not move relative to the kickdown housing 54 during adjustment. The indicator windows 80 are used to ensure that there is no such movement during adjustment. FIG. 7A shows the detent members 53 fully viewable within the indicator windows 80, i.e., the kickdown member 46 is in the rest position. FIG. 7B shows the kickdown member 46 moved from the rest position to one of the active positions, i.e., only a portion of the detent members 53 can be seen in the indicator windows 80.

A method of providing the kickdown feel in the pedal assembly 12 will now be described. The method ultimately synchronizes the kickdown feel with the downshift of the automatic transmission 42. To start, the method includes the steps of detecting the magnitude of the control signal of the electrical generator 30 and moving the pedal arm 18 relative to the pedal housing 14 while detecting the magnitude of the control signal. The magnitude of the control signal can be measured using any means known to those skilled in the art including applying a voltmeter to the electrical generator 30 and the like. Movement of the pedal arm 18 is discontinued when the control signal has the predetermined magnitude. The pedal arm 18 is secured to prevent further movement relative to the pedal housing 14 once movement of the pedal arm 18 is discontinued.

Next, the kickdown member 46 is adjusted relative to the pedal arm 18 to ensure that the pedal arm 18 engages the kickdown member 46 when the control signal of the electrical generator 30 is at the predetermined magnitude during operation of the pedal assembly 12, i.e., the kickdown feel is synchronized with the downshift of the automatic transmission.

The step of adjusting the kickdown member 46 further includes the step of sliding the kickdown member 46 relative to the pedal arm 18. This is accomplished by sliding the kickdown housing 54 enclosing the kickdown member 46 relative to the pedal housing 14 and along the plurality of adjusting fasteners 64 extending through the kickdown housing 54 into the pedal housing 14. At the same time, an assembler views the detent members 53 of the kickdown member 46 through at least one of the indicator windows 80 to ensure that the kickdown member 46 does not move relative to the kickdown housing 54 during adjustment.

Adjustment of the kickdown member 46 stops when the portion 48 of the pedal arm 18 abuts the kickdown member 46. Once adjustment of the kickdown member 46 is complete, the kickdown housing 54 is secured to the pedal housing 14 to immobilize the kickdown housing 54 and prevent further adjustment of the kickdown member 46. The step of securing the kickdown housing 54 to the pedal housing 14 to prevent further adjustment is further defined as compressing or securing the kickdown housing 54 against the pedal housing 14 using the plurality of adjusting fasteners 64. More specifically, the fasteners are screws that are tightened against the upper 60 and lower 62 flanges and locked into place in the bores 66a–66d with an epoxy. Finally, the pedal arm 18 is released and the pedal assembly 12 is ready for operation.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A pedal assembly (12) for use in a vehicle (10), comprising:
   a pedal housing (14);
   a pedal arm (18) pivotally engaging said pedal housing (14) and operable between an idle position (24) and a plurality of operable positions;
   a kickdown member (46) directly engaging a portion (48) of said pedal arm (18) when said pedal arm (18) is pivoted to a predetermined operable position (50) from said idle position (24) such that a force required to further pivot said pedal arm (18) after said pedal arm (18) reaches said predetermined operable position (50) is greater than a force required to pivot said pedal arm (18) from said idle position (24) to said predetermined operable position (50); and an electrical generator (30) supported by said pedal housing (14) for generating a control signal that varies in magnitude in proportion to the extent of movement of said pedal arm (18) relative to said pedal housing (14);

said assembly characterized by an adjustment mechanism (52) for adjusting said kickdown member (46) relative to said pedal arm (18) to ensure that said portion (48) of said pedal arm (18) directly engages said kickdown member (46) when said pedal arm (18) is at said predetermined operable position (50).

2. An assembly as set forth in claim 1 wherein said adjustment mechanism (52) engages said kickdown member (46).

3. An assembly as set forth in claim 2 wherein said adjustment mechanism (52) includes a kickdown housing (54) adjustably connected to said pedal housing (14) for enclosing said kickdown member (46).

4. An assembly as set forth in claim 3 further including a pedal arm jacket (70) for enclosing said portion (48) of said pedal arm (18).

5. An assembly as set forth in claim 4 wherein said portion (48) of said pedal arm (18) is further defined as a plate (72) connected to said pedal arm (18) and said plate (72) extends perpendicularly from said pedal arm (18) into said pedal arm jacket (70) through an opening (74) defined between said pedal housing (14) and said pedal arm jacket (70).

6. An assembly as set forth in claim 5 wherein said kickdown housing (54) further includes a lip (76) covering a portion of said pedal arm jacket (70) wherein said lip (76) is slidable across said pedal arm jacket (70) when said kickdown housing (54) is adjusted relative to said pedal housing (14).

7. An assembly as set forth in claim 6 wherein said kickdown member (46) is movable relative to said kickdown housing (54) and said kickdown housing (54) defines a plurality of indicator windows (80) for determining the extent of movement of said kickdown member (46) relative to said kickdown housing (54).

8. A method of providing a kickdown feel in a pedal assembly (12) having a pedal housing (14), a pedal arm (18) pivotally engaging the pedal housing (14), an electrical generator (30) for generating a control signal that varies in magnitude in proportion to the extent of movement of the pedal arm (18) relative to the pedal housing (14), and a kickdown member (46) for being directly engaged by the pedal arm (18), said method comprising the steps of:

detecting a magnitude of the control signal of the electrical generator (30); and moving the pedal arm (18) relative to the pedal housing (14) while detecting the magnitude of the control signal;

said method characterized by adjusting the kickdown member (46) relative to the pedal arm (18) in response to detecting a predetermined magnitude of the control signal so that the pedal arm (18) directly engages the kickdown member (46) to generate the kickdown feel when the control signal of the electrical generator (30) is at the predetermined magnitude during operation of the pedal assembly (12).

9. A method as set forth in claim 8 further including the step of discontinuing movement of the pedal arm (18) when the predetermined magnitude is detected and adjusting the kickdown member (46) relative to the pedal arm (18) after movement of the pedal arm (18) is discontinued.

10. A method as set forth in claim 9 wherein the step of adjusting the kickdown member (46) further includes the step of sliding the kickdown member (46) relative to the pedal arm (18).

11. A method as set forth in claim 10 wherein the step of adjusting the kickdown member (46) further includes the step of abutting a portion (48) of the pedal arm (18) with the kickdown member (46).

12. A method as set forth in claim 11 further including the step of discontinuing adjustment of the kickdown member (46) once the kickdown member (46) abuts the portion (48) of the pedal arm (18).

13. A method as set forth in claim 12 further including the step of securing the pedal arm (18) when movement of the pedal arm (18) is discontinued.

14. A method as set forth in claim 13 wherein the step of abutting the portion (48) of the pedal arm (18) with the kickdown member (46) is further defined as abutting the portion (48) of the pedal arm (18) with the kickdown member (46) after the pedal arm (18) is secured to ensure that the control signal generated by the electrical generator (30) remains at the predetermined magnitude after adjustment of the kickdown member (46).

15. A method as set forth in claim 14 wherein the step of sliding the kickdown member (46) relative to the pedal arm (18) further includes the step of sliding a kickdown housing (54) enclosing the kickdown member (46) relative to the pedal housing (14).

16. A method as set forth in claim 15 wherein the step of sliding the kickdown housing (54) relative to the pedal housing (14) further includes the step of viewing the kickdown member (46) through an indicator window (80) to ensure that the kickdown member (46) does not move relative to the kickdown housing (54) during adjustment.

17. A method as set forth in claim 16 wherein the step of sliding the kickdown housing (54) relative to the pedal housing (14) is further defined as sliding the kickdown housing (54) along at least one adjusting fastener (64) extending through the kickdown housing (54) into the pedal housing (14).

18. A method as set forth in claim 17 wherein the step of sliding the kickdown housing (54) along at least one adjusting fastener (64) is further defined as sliding the kickdown housing (54) along a plurality of adjusting fasteners (64) extending through the kickdown housing (54) into the pedal housing (14).

19. A method as set forth in claim 18 further including the step of securing the kickdown housing (54) to the pedal housing (14) to prevent further adjustment of the kickdown member (46).

20. A method as set forth in claim 19 wherein the step of securing the kickdown housing (54) to the pedal housing (14) to prevent further adjustment is further defined as compressing the kickdown housing (54) against the pedal housing (14) using the plurality of adjusting fasteners (64).

21. A pedal assembly (12) for use in a vehicle (10), comprising:

a pedal housing (14);

a pedal arm (18) pivotally engaging said pedal housing (14) and operable between an idle position (24) and a plurality of operable positions;

a kickdown member (46) engaging a portion (48) of said pedal arm (18) when said pedal arm (18) is pivoted to a predetermined operable position (50) from said idle position (24) such that a force required to further pivot said pedal arm (18) after said pedal arm (18) reaches said predetermined operable position (50) is greater than a force required to pivot said pedal arm (18) from said idle position (24) to said predetermined operable position (50); and an electrical generator (30) supported by said pedal housing (14) for generating a control signal that varies in magnitude in proportion to the extent of movement of said pedal arm (18) relative to said pedal housing (14), said assembly characterized by an adjustment mechanism (52) for adjusting said kickdown member (46) relative to said pedal arm (18) to ensure that said portion (48) of said pedal arm (18) engages said kickdown member (46) when said pedal arm (18) is at said predetermined operable position (50), wherein said adjustment mechanism (52) includes a kickdown housing (54) enclosing said kickdown member (46) with a first slot (56a) defined in said kickdown housing (54) and a first adjusting fastener (64a) extending through said first slot (56a) into said pedal housing (14) to adjustably connect said kickdown housing (54) to said pedal housing (14).

22. An assembly as set forth in claim 21 wherein said kickdown housing (54) defines a second slot (56b) and said adjustment mechanism (52) further includes a second adjusting fastener (64b) extending through said second slot (56b) into said pedal housing (14) whereby said kickdown housing (54) is adjusted by sliding said kickdown housing (54) relative to said pedal housing (14) along said first (64a) and second (64b) adjusting fasteners.

23. An assembly as set forth in claim 22 wherein said pedal housing (14) defines first (66a) and second (66b) bores and said first (64a) and second (64b) adjusting fasteners extend through said first (56a) and second (56b) slots into said first (66a) and second (66b) bores.

24. An assembly as set forth in claim 23 wherein said kickdown housing (54) further defines third (56c) and fourth (56d) slots and said adjustment mechanism (52) further includes third (64c) and fourth (64d) adjusting fasteners and said pedal housing (14) further includes third (66c) and fourth (66d) bores wherein said third adjusting fastener (64c) extends through said third slot (56c) into said third bore (66c) and said fourth adjusting fastener (64d) extends through said fourth slot (56d) into said fourth bore (66d) whereby said kickdown housing (54) is adjusted by sliding said kickdown housing (54) relative to said pedal housing (14) along said first (64a), second (64b), third (64c), and fourth (64d) adjusting fasteners.

25. An assembly as set forth in claim 24 further including a plurality of snug-fit bushings (68) positioned in said bores (66) in said pedal housing (14) wherein said adjusting fasteners (64) extend through said slots (56) and said snug-fit bushings (68) in said bores (66) for creating a snug-fit between the adjusting fasteners (64) and the pedal housing (14).

26. An assembly as set forth in claim 25 wherein said kickdown housing (54) includes a main portion (58) and upper (60) and lower (62) flanges connected to said main portion (58) and extending upwardly and downwardly from said main portion (58) wherein said first (56a) and third (56c) slots are defined in said upper flange (60) and said second (56b) and fourth (56d) slots are defined in said lower flange (62).

* * * * *